United States Patent
Hakulinen

(10) Patent No.: US 6,608,885 B1
(45) Date of Patent: Aug. 19, 2003

(54) METHOD SYSTEM AND DEVICE FOR LINE MONITORING

(75) Inventor: Martti Juhani Hakulinen, Kouvola (FI)

(73) Assignee: Computec Oy, Kouvola (FI)

( * ) Notice: Subject to any disclaimer, the term of this patent is extended or adjusted under 35 U.S.C. 154(b) by 0 days.

(21) Appl. No.: 09/831,938

(22) PCT Filed: Nov. 16, 1999

(86) PCT No.: PCT/FI99/00950
§ 371 (c)(1),
(2), (4) Date: Aug. 6, 2001

(87) PCT Pub. No.: WO00/33546
PCT Pub. Date: Jun. 8, 2000

(30) Foreign Application Priority Data

Nov. 16, 1998 (FI) .................................................. 982475

(51) Int. Cl.⁷ .......................... H04M 1/24; H04M 11/04
(52) U.S. Cl. ................ 379/32.02; 379/1.01; 379/32.01; 379/33; 379/37; 379/40
(58) Field of Search ............................. 379/1.01, 26.01, 379/27.04, 29.01, 32.01, 32.02, 32.03, 33, 37, 40, 43, 44; 340/870.09, 853.2, 502, 503, 504, 506; 324/512; 714/100, 1, 47, 48, 49, 57

(56) References Cited

U.S. PATENT DOCUMENTS

| | | | |
|---|---|---|---|
| 4,558,181 A | * | 12/1985 | Blanchard et al. ............. 379/40 |
| 4,935,952 A | * | 6/1990 | Dutra ........................... 379/40 |
| 4,993,059 A | | 2/1991 | Smith et al. |
| 5,319,700 A | * | 6/1994 | Mano et al. .............. 379/93.06 |
| 5,388,150 A | * | 2/1995 | Schneyer et al. ........ 379/88.19 |
| 5,828,978 A | * | 10/1998 | Anand et al. ................ 701/117 |
| 5,982,851 A | * | 11/1999 | Kennedy et al. ............... 379/21 |
| 6,014,426 A | * | 1/2000 | Drysdale et al. ............... 379/33 |

FOREIGN PATENT DOCUMENTS

| | | |
|---|---|---|
| EP | 0 417 944 | 3/1991 |
| FI | 812428 | 2/1983 |
| SE | 9504705-6 | 6/1997 |
| WO | 98/25396 | 6/1998 |

* cited by examiner

Primary Examiner—Curtis Kuntz
Assistant Examiner—Quoc Duc Tran
(74) Attorney, Agent, or Firm—Young & Thompson

(57) ABSTRACT

A method, a system and a master terminal for line monitoring in system comprising a telephone network (ISDN), a master terminal (MASTER) connected to a place of reception (PR) of a response and to the telephone network (ISDN), and a slave terminal (SLAVE) connected to an object being monitored (OM) and to the telephone network (ISDN). The setup of a control call from the master terminal (MASTER) to the slave terminal (SLAVE) is started, the control call originated by the master terminal (MASTER) is identified by the slave terminal (SLAVE) on the basis of a predetermined ringing procedure before answering the call, the call setup procedure is terminated, the setup of an acknowledgment call from the slave terminal (SLAVE) to the master terminal (MASTER) is started upon the lapse of a suitable length of time after the control call, the acknowledgment call received from the slave terminal (SLAVE) is identified by the master terminal (MASTER) on the basis of a predetermined ringing procedure before answering the call, and the call setup procedure is terminated.

20 Claims, 1 Drawing Sheet

METHOD SYSTEM AND DEVICE FOR LINE MONITORING

BACKGROUND OF THE INVENTION

The present invention relates to monitoring systems. In particular, the invention concerns a method, system and terminal equipment for line monitoring, i.e. for technical monitoring of a line between two points.

For remote-monitoring systems, it is essential that the connection between the object under monitoring and the place of reception of the response should function reliably. In prior art, a solution is known in which the state of the object under monitoring is checked via a telephone connection. Line monitoring is accomplished simultaneously; if the connection between the two points is functional, then it can be assumed that the line is also functional. However, for each check it is necessary to make a call, open an audio line, which means that the telephone network will charge for the pulse produced. In the case of frequently repeated checks, the costs are considerable. In addition, in the solution in question, the operation of a robot telephone can be interfered with by calling the number of the robot telephone from an ordinary telephone and leaving the line busy. In another solution, the state of a network termination unit can be monitored by technical means from a telephone exchange. In this case, however, the monitoring does not cover the line from the network termination unit to the terminal adapter and the object under monitoring.

SUMMARY OF THE INVENTION

The object of the present invention is to eliminate or at least to significantly alleviate the drawbacks referred to above. A further object of the invention is to disclose a new type of method, system and associated terminal equipment for monitoring the line between an object under monitoring and the place of reception of the response. The invention enables reliable line monitoring without call charges resulting from opening a call.

The invention concerns a method for line monitoring in a monitoring system. The monitoring system comprises a telephone network, a master terminal connected to the place of reception of the response and to the telephone network, and a slave terminal connected to the object under monitoring and to the telephone network. The telephone network may be e.g. an integrated services digital network ISDN. The method of the invention comprises two main steps, a control call by the master terminal to the slave terminal and an acknowledgement call by the slave terminal. The setup of the control call is started from the master terminal to the slave terminal. The slave terminal identifies the control call originated by the master terminal on the basis of a predetermined call procedure before answering the call. The slave terminal does not answer the call and the call setup procedure is terminated.

The setup of the acknowledgement call from the slave terminal to the master terminal is started upon the lapse of a certain length of time after the control call. A suitable time may be immediately after the control call or after a predetermined delay. The master terminal identifies the acknowledgement call of the slave terminal on the basis of a predefined ringing procedure before answering the call. The master terminal does not answer the call but terminates the call setup procedure.

In a preferred embodiment of the invention, the B-party's terminal, i.e. the terminal of the receiver of the call, identifies the A-party number transmitted in the signalling sent by the A-party, i.e. the originator of the call. In an embodiment, call setup is terminated by the A-party's terminal after the A-party has received an ALERTING message. The A-party may be either the master or the slave terminal, each in its turn. From the B-party number transmitted in conjunction with the ALERTING message, the master terminal can verify that the call has been connected to the right slave terminal.

The ISDN network allows call setdown by the B-party as well. In an embodiment, the setup of the acknowledgement call is terminated by the master terminal after the master terminal has received a SETUP message from the slave terminal. In this case, the acknowledgement is obtained faster because the slave does not have to wait for an ALERTING message from the master.

Especially in burglar alarm applications, it is, important that fooling the monitoring line be as difficult as possible. In an embodiment, to improve the identity protection of the terminal, the terminal adapter comprised in the terminal is indicated via multiple subscriber numbering (MSN). The terminal adapter is connected to the network termination unit via an S-interface. In an embodiment, the properties of the B-party terminal are checked by means of a Low Layer Compatibility information element (LLC) included in the SETUP message, thus providing a further improvement in identity protection. The data in the LLC information element may include the type of the receiving telecommunication terminal, which is known to the telephone exchange. The exchange will not connect the call if the data in the LLC information element is different from the terminal type. In a preferred embodiment of the method, an alarm is issued if the ringing procedure deviates from a predetermined procedure. The alarm may be delivered by either one of the terminals.

The invention additionally concerns a line monitoring system used to monitor the line between the object being monitored by a monitoring system and the place of reception of the response. The system comprises an ISDN network, a master terminal, which is connected to the place of reception of the response and to the integrated services network, and at least one slave terminal, which is connected to the object to be monitored and to the integrated services network. In the system of the invention, the slave terminal comprises means for identifying a control call originated by the master terminal before answering he call, and means for starting the setup of an acknowlegement call from the slave terminal to the master terminal upon the lapse of a suitable length of time after the control call. The master terminal comprises means for identifying am acknowledgement call originated by the slave terminal before answering the call and means for activating an alarm function when the ringing procedure differs from a predetermined procedure. In an embodiment of the system, the master terminal comprises means for ringing a control call at a predetermined instant of time. The predetermined instant of time is e.g. a recurrent point of time or a given interval of time after the previous control call, the master polling one or more slaves at said instant.

The invention also concerns a master terminal for a monitoring system. It comprises a network termination unit connected to an integrated services digital network via a U-interface, a terminal adapter connected to the network termination unit via an S-interface, and an element connecting the terminal adapter to the place of reception of the response. The master terminal of the invention comprises means for establishing a control call to a slave terminal, means for terminating the control call before the call has been set up, means for identifying an acknowledgement call originated by the slave terminal and leaving it unanswered, and means for activating alarm function when the ringing procedure deviates from a predetermined procedure. The master terminal preferably comprises means for identifying a slave terminal on the basis of the A-party number.

A master terminal according to the invention comprises means for terminating call setup upon the reception of an ALERTING message from the slave terminal. The ALERTING message preferably comprises the number of the B-party, so the master will know that it is terminating the right call. A master terminal comprises means for terminating call setup upon the reception of a SETUP message from the slave terminal A master terminal according to the invention comprises means for including in the SETUP message a Low Layer Compatibility information element corresponding to the properties of the slave terminal. In an embodiment, the terminal adapter connected to the network termination unit via an S-interface is indicated via multiple subscriber numbering. In an embodiment, the master terminal comprises means for ringing a control call at a predetermined instant of time.

The invention further concerns a slave terminal for a monitoring system, comprising a network termination unit fitted for connection to an integrated services digital network via a U-interface; a terminal adapter connected to the network termination unit via an S-interface; and an element connecting the terminal adapter to an object under monitoring. According to the invention, the slave terminal comprises means for identifying a control call originated by a master terminal and for leaving it unanswered; and means for establishing an acknowledgement call to the master terminal in a predetermined manner. The slave terminal preferably comprises means for identifying the master terminal on the basis of the A-party number.

In an embodiment, the slave terminal comprises means for terminating call setup upon the reception of an ALERTING message. The slave terminal comprises means for disconnecting the call when an unknown A-party is calling, thus making it impossible for any outsider to keep the telephone line busy. The slave terminal also comprises means for activating an alarm function when the ringing procedure deviates from a predetermined procedure, thus making it possible to take the effect of e.g. sabotage, mischief or malfunctions on the monitoring system into account.

As compared with prior art, the invention provides the advantage that the state of a slave terminal connected to an object under monitoring can be monitored remotely via a telephone network without incurring call charges. The invention makes it possible to monitor the line all the way from the point of reception of the response to the object under monitoring. The invention does not require any changes in the existing exchange equipment, but it can be utilized independently of the network operator. Moreover, the telephone line can also be used for normal calls because the terminals do not answer calls received from a known address or answer only after the lapse of a given waiting time.

BRIEF DESCRIPTION OF THE DRAWINGS

In the following, the invention will be described by the aid of a few examples of its embodiments with reference to the attached drawing, in which.

DESCRIPTION OF THE PREFERRED EMBODIMENTS

Figure 1:
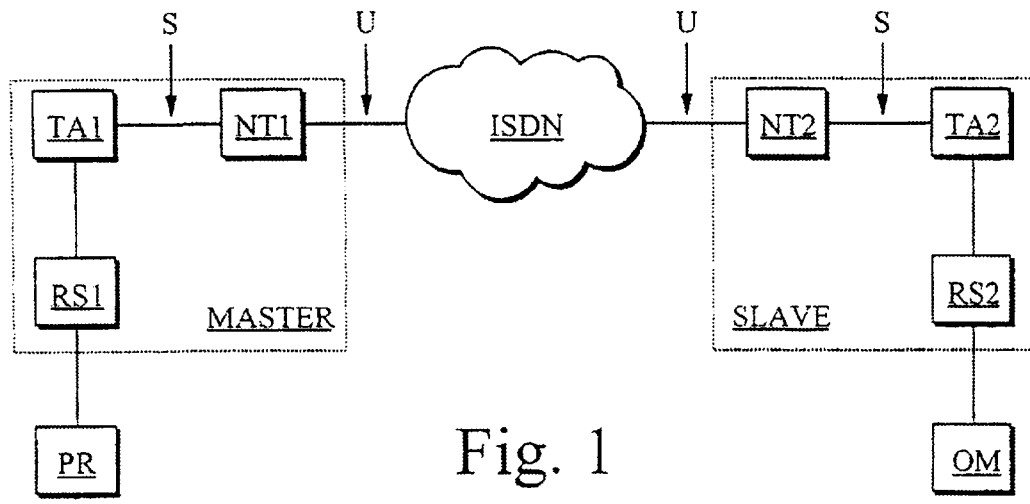
FIG. 1 presents a diagram representing a system according to the present invention.

FIG. 1 presents a system according to the invention. In this example, signalling is transmitted via an integrated services digital network ISDN. The invention can also be applied in other telephone networks in which the corresponding functionalities required by the invention are implemented. A network termination unit NT1 comprised in a mascer terminal MASTER is connected via a U-interface to the ISDN network. A terminal adapter TA1 is connected via an S-interface to the network termination unic NT1. Connected to the terminal adapter TA1 is an element RS1 which connects the master terminal MASTER to the place of reception PR of the response. This element RS1 implements e.g. the RS-232 protocol. The place of reception PR of the response is e.g. a fire alarm center, a private security company, a police station or a center remotely monitoring a process or activity. Via the telephone network ISDN, a slave terminal SLAVE can be connected to the master terminal MASTER.

The network termination unit NT2 comprised in the slave terminal SLAVE is connected to the ISDN network via a U-interface. Connected to the network termination unit NT2 via an S-interface is a terminal adapter TA2. The terminal adapter TA2 is connected via element RS2 to the object monitored OM. The RS2 element implements e.g. the RS-232 protocol. Both the master terminal MASTER and the slave terminal SLAVE are implemented e.g. as a computer or a suitable microcontroller application, in which case the means comprised in the terminals can be implemented via software.

Figure 2:
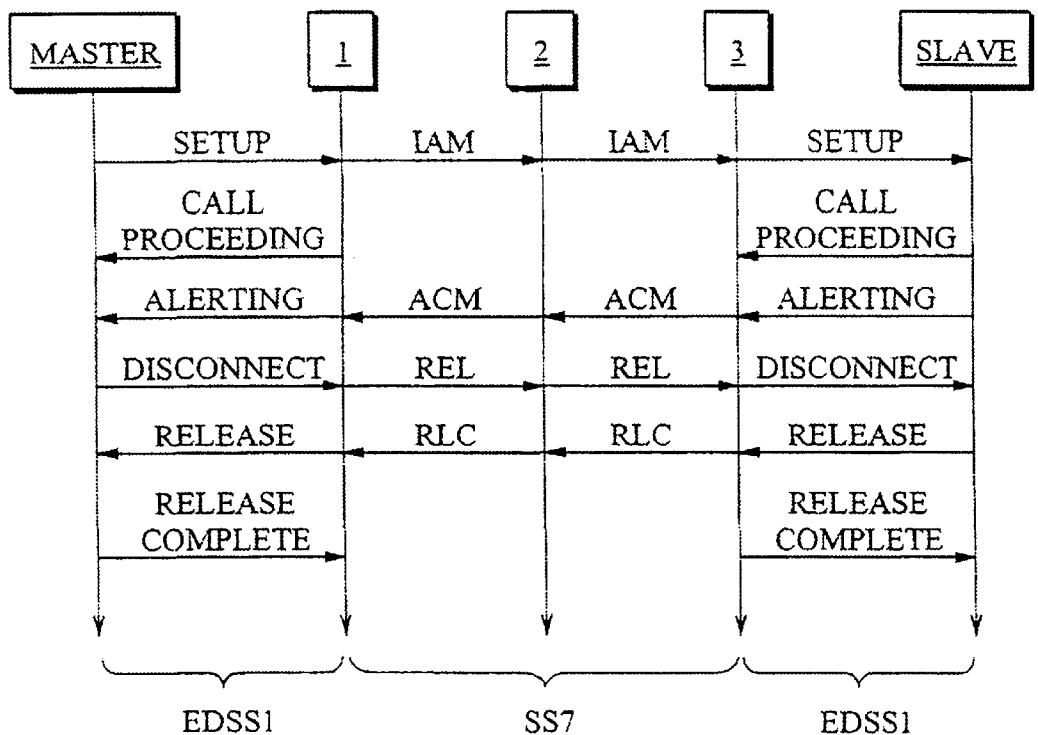
FIG. 2 presents a signalling diagram illustrating a signalling arrangement according to the invention.

FIG. 2 presents a signalling arrangement according to the invention. In the ISDN network, the master terminal MASTER is connected to an originating exchange 1, which is connected to a transit exchange 2. This is further connected to a receiving exchange 3, to which the slave terminal SLAVE is connected. It is to be understood that the telephone network consists of a number of different links, so there may be one or more exchanges 1–3. In the example, the master terminal MASTER is the A-party and the slave terminal SLAVE is the B-party. The connections MASTER-1 and SLAVE-3 between the terminals and the exchanges are implemented using EDSS1 subscriber signalling (EDSS1, European Digital Subscriber Signalling 1), whereas the connections between the exchanges 1–3 are implemented using common channel signalling SS7 (Signalling System 7).

The A-party MASTER Rends a SETUP message to the originating exchange 1. The message comprises an LLC element, which presents the A-party number including the area code as well as the special properties of the service request. The message also comprises an MSN number used to indicate the terminal adapter TA2 connected to the network termination unit NT2. The originating exchange 1 generates for the A-party a CALL PROCEEDING message, by means of which it confirms that call setup is proceeding. The originating exchange generates in common channel signalling SS7 an IAM message (Initial Address Message), which is forwarded via the transit exchange 2 to the receiving exchange 3. The exchange 3 transmits the SETUP message to the B-party SLAVE. The message is transmitted on condition that the LLC information element defines the S-interface protocol so that it is compatible with the B-party SLAVE. The B-party SLAVE returns to the originating exchange a CALL PROCEEDING message to indicate that it has received the message correctly.

The slave terminal SLAVE comprises means for identifying the master terminal, in other words, it checks in a table whether the A-party number received in the SETUP message is comprised in a list of allowed numbers and whether a correct type of service request has been received in the LLC information element. If the number is not included in the list, or if the request is wrong, then the caller may be an undesired party, e.g. a burglary attempt. The B-party's terminal equipment comprises means for disconnecting the call in such situations.

The B-party SLAVE returns to the exchange 3 an ALERTING message to indicate that the terminal is alerting. The message is transmitted between the exchanges 3–1 as an ACM message (ACM, Address Complete). The ALERTING message is transmitted to the A-party MASTER, the message including the B-party number, from which the A-party can see that the call has been correctly routed. The A-party MASTER disconnects the call by sending a DISCONNECT message to exchange 1. The message is transmntted between the exchanges 1–3 as a REL message (EL, Release). The DISCONNECT message is transmitted to the B-party SLAVE, whereupon the B-party acknowledges disconnection of the call by sending a RELEASE message. Exchange 3 acknowledges this by sending a RELEASE COMPLETE message to the B-party SLAVE. The message is transmitted between the exchanges 3–1 as a RLC message (RLC, Release Complete). With a RELEASE message, the A-party MASTER is informed about the disconnection of the call, and the A-parry acknowledges this by sending a RELESE COMPLETE message to exchange 1. Thus, the B-party does not answer the call.

After this, the slave terminal SLAVE rings an acknowledgement call to the master terminal MASTER, whereupon the events proceed in a sequence corresponding to the above description, with the exception that the slave terminal SLAVE is now the A-party and the master terminal MASTER is the B-party. This call back is used to verify the operation of the link between PR-OM as well as that of the software in the terminals. The control call originated by the master terminal MASTER only monitors the link between PR-TA2, for the terminal adapter TA2 does not give a CALL PROCEEDING message if the LLC information element contains the wrong service request.

The terminals MASTER, SLAVE infer from the duration of the alerting time (ALERTING) whether the call is answered or not. Thus, the terminals can also be used for a switched connection e.g. in situations where more information is to be transmitted between the terminals. In the case of an actual alarm, e.g. a burglary or fire alarm, the slave terminal SLAVE can ring a separate alarm call to the master terminal MASTER. In this case, the operation deviates from the normal control-acknowledgement procedure and the alarm information is transmitted e.g. using a switched connection.

The invention is not restricted to the examples of its embodiments described above, but many variations are possible within the scope of the inventive idea defined in the claims.

What is claimed is:

1. Method for line monitoring in a system comprising
    an integrated services digital network (ISDN);
    a master terminal (MASTER), which is connected to a place of reception (PR) of a response and to the integrated services digital network (ISDN); and
    a slave terminal (SLAVE), which is connected to an object being monitored (OM) and to the integrated services digital network (ISDN),
    wherein the method comprises the steps of:
        starting a first call setup of a control call from the master terminal (MASTER) to the slave terminal (SLAVE);
        identifying by means of the slave terminal (SLAVE) the control call originated by the master terminal (MASTER) on the basis of a predetermined ringing procedure before answering the control call;
        terminating the first call setup procedure;
        starting a second call setup of an acknowledgement call from the slave terminal (SLAVE) to the master terminal (MASTER) upon lapse of a suitable length of time after the control call;
        identifying by means of the master terminal (MASTER) the acknowledgment call originated by the salve terminal (SLAVE) on the basis of a predetermined ringing procedure before answering the acknowledgement call; and
        terminating the second call setup procedure.

2. The method as defined in claim 1, wherein a calling terminal is identified on the basis of an A-party number.

3. The method as defined in claim 1, wherein the first and second call setups are terminated by an A-party's terminal after the A-party has received an ALERTING message.

4. The method as defined in claim 1, wherein the second call setup of the acknowledgement call is terminated by the master terminal (MASTER) after the master terminal has received a SETUP message.

5. The method as defined in claim 1, wherein a terminal adapter connected via an S-interface to a network termination unit comprised in the terminal equipment is indicated via multiple subscriber numbering.

6. The method as defined in claim 1, wherein properties of a B-party's terminal are checked by means of a Low Layer Compatibility information element included in the call setup.

7. The method as defined in claim 1, wherein an alarm is issued when the ringing procedure deviates from a predetermined procedure.

8. Line monitoring system, comprising
    an integrated services digital network (ISDN);
    a master terminal (MASTER connected to a place of reception (PR) of a response and to the integrated services network (ISDN); and
    at least one slave terminal (SLAVE) connected to an object being monitored (OM) and to the integrated services network (ISDN), wherein
    the slave terminal (SLAVE) comprises means for identifying a control call originated by the master terminal (MASTER) before answering the control call;
    the slave terminal (SLAVE) comprises means for starting the setup of an acknowledgement call from the slave terminal (SLAVE) to the master terminal (MASTER) upon the lapse of a suitable length of time after the control call; and
    the master terminal (MASTER) comprises means for identifying the acknowledgement call originated by the slave terminal (SLAVE) before answering the acknowledgement call; and
    the master terminal (MASTER) comprises means for executing an alarm function when a ringing procedure deviates from a predetermined procedure.

9. The line monitoring system as defined in claim 8, wherein the master terminal (MASTER) comprises means for ringing a control call at a predetermined instant of time.

10. Master terminal for a monitoring system, comprising:
a network termination unit (NT1) fitted for connection to an integrated services digital network (ISDN) via a U-interface;
a terminal adapter (TA1) connected to the network termination unit (NT1) via an S-interface; and
an element (RS1) connecting the terminal adapter (TA1) to a place of reception (PR) of a response, wherein the master terminal (MASTER) comprises,
means for establishing a control call to a slave terminal (SLAVE);
means for terminating the control call before the control call has been set up;
means for identifying an acknowledgement call originated by the slave terminal (SLAVE) and for leaving the acknowledgement call unanswered; and
means for executing an alarm function when a ringing procedure deviates from a predetermined procedure.

11. The master terminal (MASTER) as defined in claim 10, wherein the master terminal (MASTER) comprises means for identifying the slave terminal (SLAVE) on the basis of an A-party number.

12. The master terminal as defined in claim 10, wherein the master terminal (MASTER) comprises means for terminating the control call upon the reception of an ALERTING message.

13. The master terminal as defined in claim 10, wherein the master terminal (MASTER) comprises means for terminating the control call upon the reception of a SETUP message from the slave terminal (SLAVE).

14. The master terminal as defined in claim 10, wherein the master terminal (MASTER) comprises means for including a Low Layer Compatibility information element corresponding to properties of the slave terminal (SLAVE) in a setup message.

15. The master terminal as defined in claim 10, wherein the terminal adapter (TA1) connected via an S-interface to the network termination unit (NT1) is indicated via multiple subscriber numbering.

16. The master terminal as defined in claim 10, wherein the master terminal (MASTER) comprises means for ringing the control call at a predetermined instant of time.

17. Slave terminal for a monitoring system, comprising:
a network termination unit (NT2) fitted to be connected to an integrated services digital network (ISDN) via a U-interface;
a terminal adapter (TA2) connected to the network termination unit (NT2) via an S-interface; and
an element (RS2) connecting the terminal adapter (TA2) to an object being monitored wherein, the slave terminal (SLAVE) comprises,
means for identifying a control call originated by a master terminal (MASTER) and for leaving the control call unanswered; and
means for establishing an acknowledgement call to the master terminal (MASTER) in a predetermined manner.

18. The slave terminal as defined in claim 17, wherein the slave terminal (SLAVE) comprises means for identifying the master terminal (MASTER) on the basis of an A-party number.

19. The slave terminal as defined in claim 17, wherein the slave terminal (SLAVE) comprises means for terminating call setup upon reception of an ALERTING message.

20. The slave terminal as defined in claim 17, wherein the slave terminal (SLAVE) comprises means for disconnecting the control call when an unknown A-party is calling.

* * * * *